United States Patent [19]
Chatani et al.

[11] Patent Number: 5,439,136
[45] Date of Patent: Aug. 8, 1995

[54] MERCHANDISE PUSH-OUT DEVICE FOR VENDING MACHINES

[75] Inventors: Hisashi Chatani, Ashiya; Hiroyuki Haruna, Hiyogo, both of Japan

[73] Assignee: WADA Metal of America Corp., Rome, Ga.

[21] Appl. No.: 103,921

[22] Filed: Aug. 10, 1993

[30] Foreign Application Priority Data

Aug. 12, 1992 [JP] Japan .................... 4-056733 U

[51] Int. Cl.⁶ .................................... B65G 59/00
[52] U.S. Cl. .................... 221/258; 221/270; 221/272
[58] Field of Search .......... 414/797.9; 221/268, 221/270, 272-274, 258, 251

[56] References Cited

U.S. PATENT DOCUMENTS

| | | | |
|---|---|---|---|
| 1,807,404 | 5/1931 | Goss | 221/270 |
| 1,887,197 | 11/1932 | Giles | 221/270 |
| 3,618,821 | 11/1971 | Lang et al. | 221/268 |
| 4,363,393 | 12/1982 | McDonald | 221/273 |
| 4,865,222 | 9/1989 | Sullivan | 221/268 |
| 5,148,944 | 9/1992 | Kaufman et al. | 221/268 |

FOREIGN PATENT DOCUMENTS 3-90704  11/1991  Japan .
20806  9/1985  United Kingdom ........ 221/273

Primary Examiner—H. Grant Skaggs
Attorney, Agent, or Firm—Troutman Sanders

[57] ABSTRACT

A merchandise push-out device for a vending machine, which pushes forward the lowermost piece of merchandise in a merchandise stocker in which merchandise is stacked vertically and supports the remaining pieces of stacked merchandise in a substantially horizontal position. A rocking arm has an upper end which is rocked back and forth from a support shaft by a motor drive. A merchandise push-out roller is attached to the upper end of the rocking arm, and a merchandise support roller is attached to the push-out roller below it with a link. When the rocking arm is rocked, the push-out roller, utilizing vertical play in the rocking arm, is moved forward in the horizontal linear direction to push-out the lowermost piece of merchandise. While the lowermost merchandise is being pushed out, the upper merchandise is supported by the support roller, which is pulled into place by the push-out roller. The push-out member and the support member work in tandem to prevent the upper merchandise from tilting extensively. During the merchandise push-out operation, no upward force is applied to the stacked merchandise, and, therefore, the motor load and the power consumption are reduced.

15 Claims, 4 Drawing Sheets

MERCHANDISE PUSH-OUT DEVICE FOR VENDING MACHINES

BACKGROUND OF THE INVENTION

1. Field of Invention

This invention relates to a merchandise push-out device for a vending machine, which pushes forward the lowermost piece of merchandise in a merchandise stocker in which merchandise is stacked vertically and supports the remaining pieces of stacked merchandise in a substantially horizontal position. This device is directed to a merchandise push-out device for vending machines used to sell box-shaped merchandise such as cigarettes. It is especially useful for energy-saving vending machines which utilize batteries as their power source.

2. Description of the Prior Art

Vending machines powered by batteries have attracted attention lately due to their advantage of being able to eliminate restrictions regarding the location of the machines. Due to the limitation of available electricity, these types of battery-operated vending machines must be designed so that their internal mechanism operate with as little power consumption as possible.

In such a vending machine, one of the typical internal mechanisms operated by electricity is a merchandise push-out mechanism. This type of merchandise push-out mechanism depends, for example, on the merchandise stock method. When the merchandise is stacked vertically and the lowermost piece of merchandise is pushed forward, prompting the next piece of merchandise to move downward due to its own weight, the following mechanism may be adopted. A motor-driven arm, whose top part rocks back and forth from the rocking shaft, is installed with a push-out member being installed at the top end of the arm. By rocking the arm, the lowermost piece of merchandise may be pushed forward from its back by the push-out member. This mechanism has a special advantage of being effective in reducing the thickness of the vending machine.

There are, however, the following problems concerning the above-mentioned rocking arm push-out mechanism in the previous proposal. As shown in FIG. 4, when the push-out member 100 moves forward from the retreat position and pushes the lowermost piece of merchandise A inside the stocker 101, the upper pieces of merchandise above the push-out member, as shown in FIG. 5, tilt. This causes the other merchandise A in the upper part of the stocker to also tilt. Therefore, as shown in FIG. 6, when the push-out member retreats after pushing out the lowermost piece of merchandise A, the push-out member must retreat while pushing up the above-mentioned tilted merchandise A. During this process, the merchandise is tilted in the opposite direction, and when the push-out member moves out from under it, the remaining merchandise falls horizontally onto the support guide plate due to the combined weight of the remaining merchandise.

Such see-saw movement of the merchandise creates friction between the pieces of merchandise inside the stocker. This increases the possibility of the merchandise being damaged. Furthermore, this movement applies a large load to the drive motor, which activates the push-out member, since the push-out member is required to push up all of the stocked merchandise while retreating. In other words, the motor load includes the load caused by the force pushing up the stock merchandise, as well as the load caused by the force pushing out the lowermost piece of merchandise. Consequently, in addition to the power consumed purely for pushing out the merchandise, the power for pushing up the total stocked merchandise is consumed wastefully.

SUMMARY OF THE INVENTION

This device is directed to a merchandise push-out device for a vending machine, which pushes forward the lowermost piece of merchandise in a merchandise stocker in which merchandise is stacked vertically and supports the remaining pieces of stacked merchandise is a substantially horizontal position. The purpose of the present device is to provide a rocking arm merchandise push-out device for vending machines, which eliminates the drawbacks mentioned in the prior art and reduces the power consumption by reducing the motor load as described in the prior art.

This device is equipped with a motor-driven rocking arm whose upper part rocks back and forth from a rocking support shaft. At the merchandise push-out level, which is the upper part of the rocking arm, a push-out member consisting of a roller and other parts are installed to the upper part of the rocking arm. These parts are installed such that there is vertical play in the upper and lower portion of the rocking arm. A guide member is located below the push-out member to guide the push-out member in the longitudinal, horizontal, linear direction by utilizing the vertical play during the rocking of the arm.

In this merchandise push-out device for vending machines, a support member is connected to the rear of the push-out member via a link. The support member acts as a follow-up mechanism and supports the next piece of stocked merchandise when the push-out member is activated. The guide member has an inclined guide area, which guides the support member to a waiting position below the push-out device when the push-out device retreats along the guide member. The inclined guide area allows the support member to be in a horizontally collapsed position with respect to the push-out member when the push-out member is in a waiting position.

In the above construction, when the motor is driven, the upper part of the rocking arm extending from the rocking support shaft rocks back and forth. The push-out member, however, moves in a horizontal linear direction, utilizing the vertical play in a rocking arm mounting area located below the upper part of the rocking arm such that the push-out member is guided by the guide member.

In addition, when the merchandise is pushed out, the support member supports the upper merchandise from below, preventing it from tilting extensively. Therefore, there is no need to push up the upper merchandise while the push-out member is retreating. Consequently, during the series of movements in which the lowermost piece of the stocked merchandise is pushed out, there is no upward force applied by the push-out member to the upper stocked merchandise. This, in turn reduces the motor load and the power consumption.

DETAILED DESCRIPTION OF ILLUSTRATIVE EMBODIMENT

Figure 1:
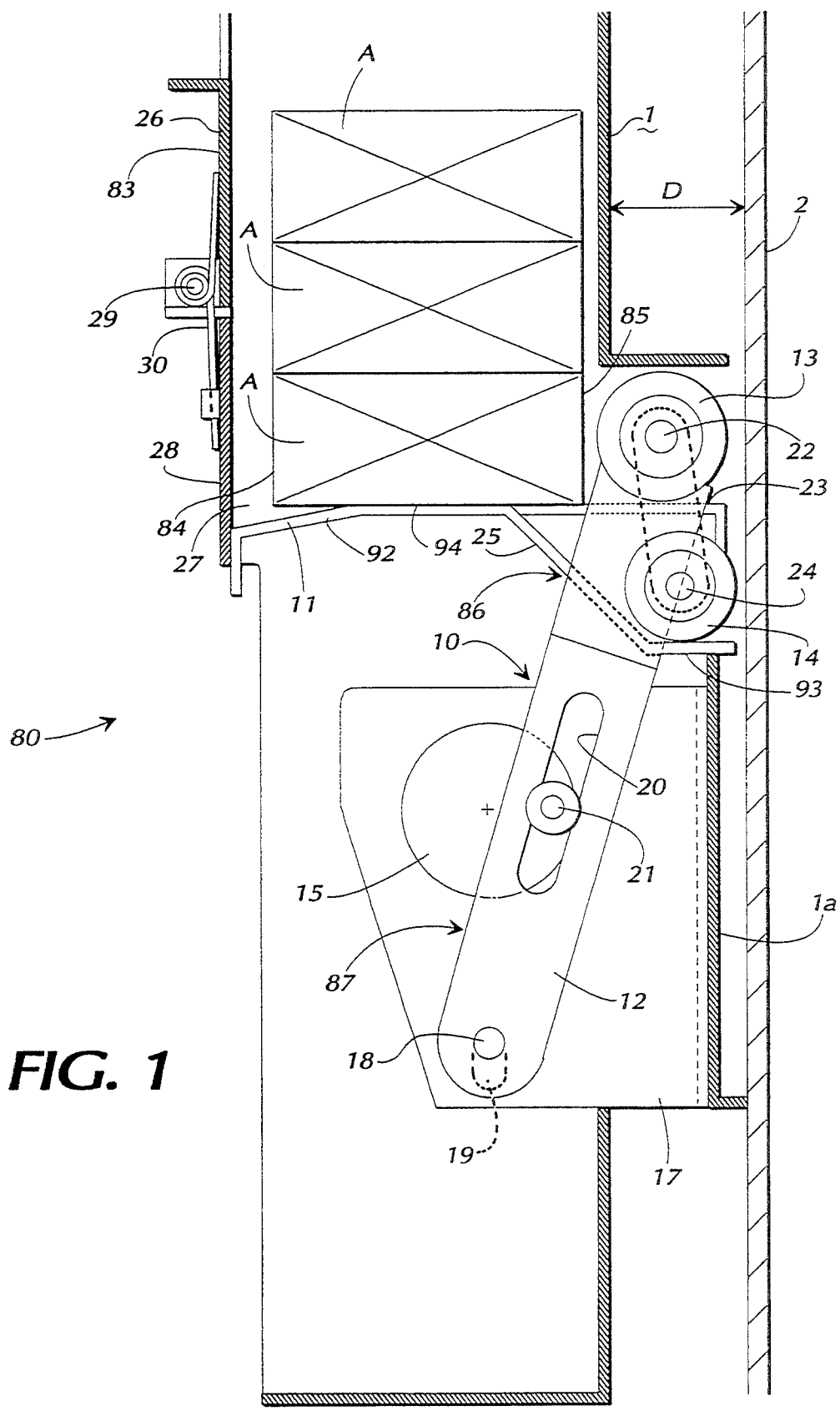
FIG. 1 is a cross-sectional of the merchandise push-out device in the waiting position.
Figure 2:
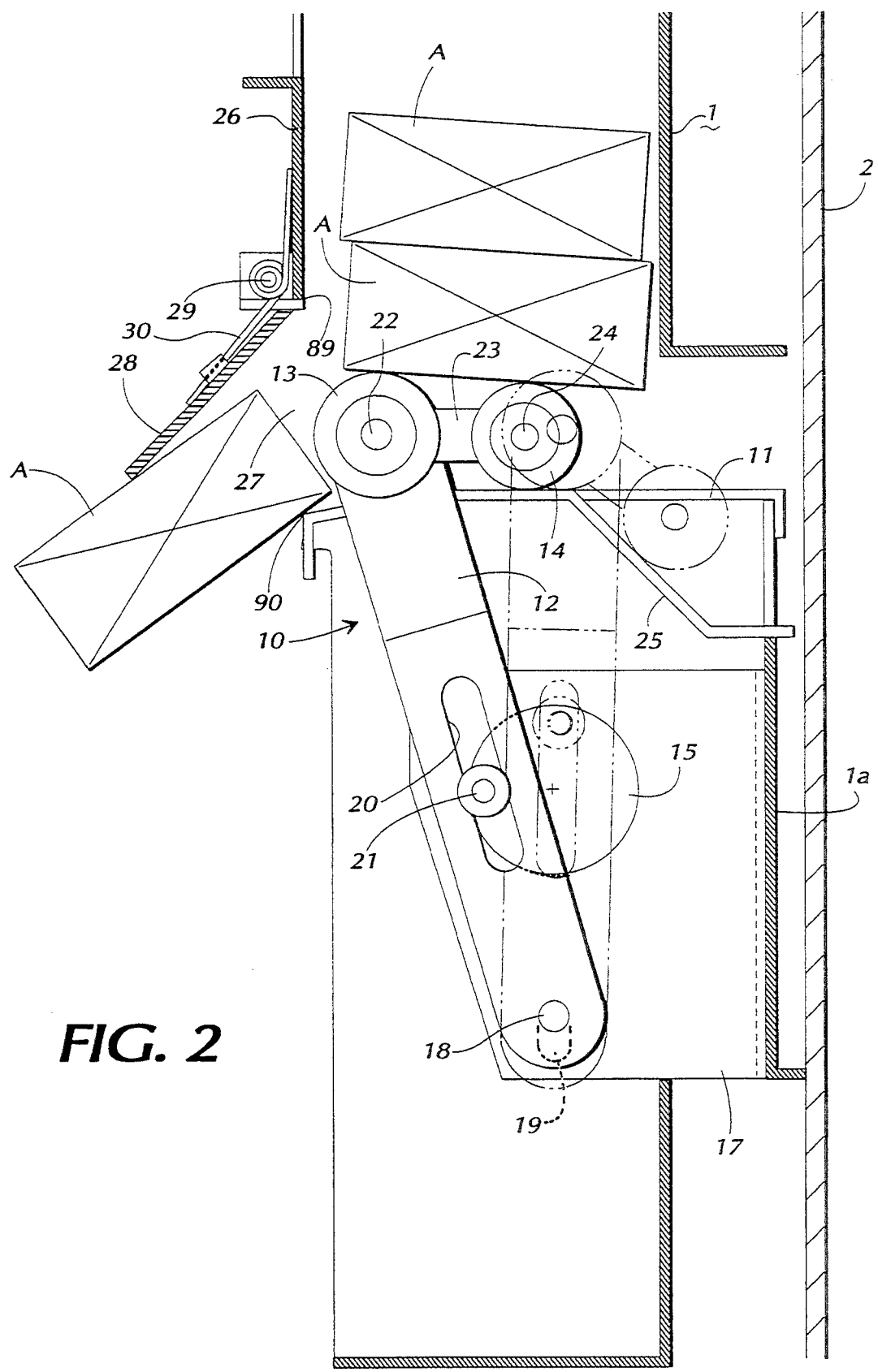
FIG. 2 is a cross-sectional view of the merchandise push-out device during the push-out operation.
Figure 3:
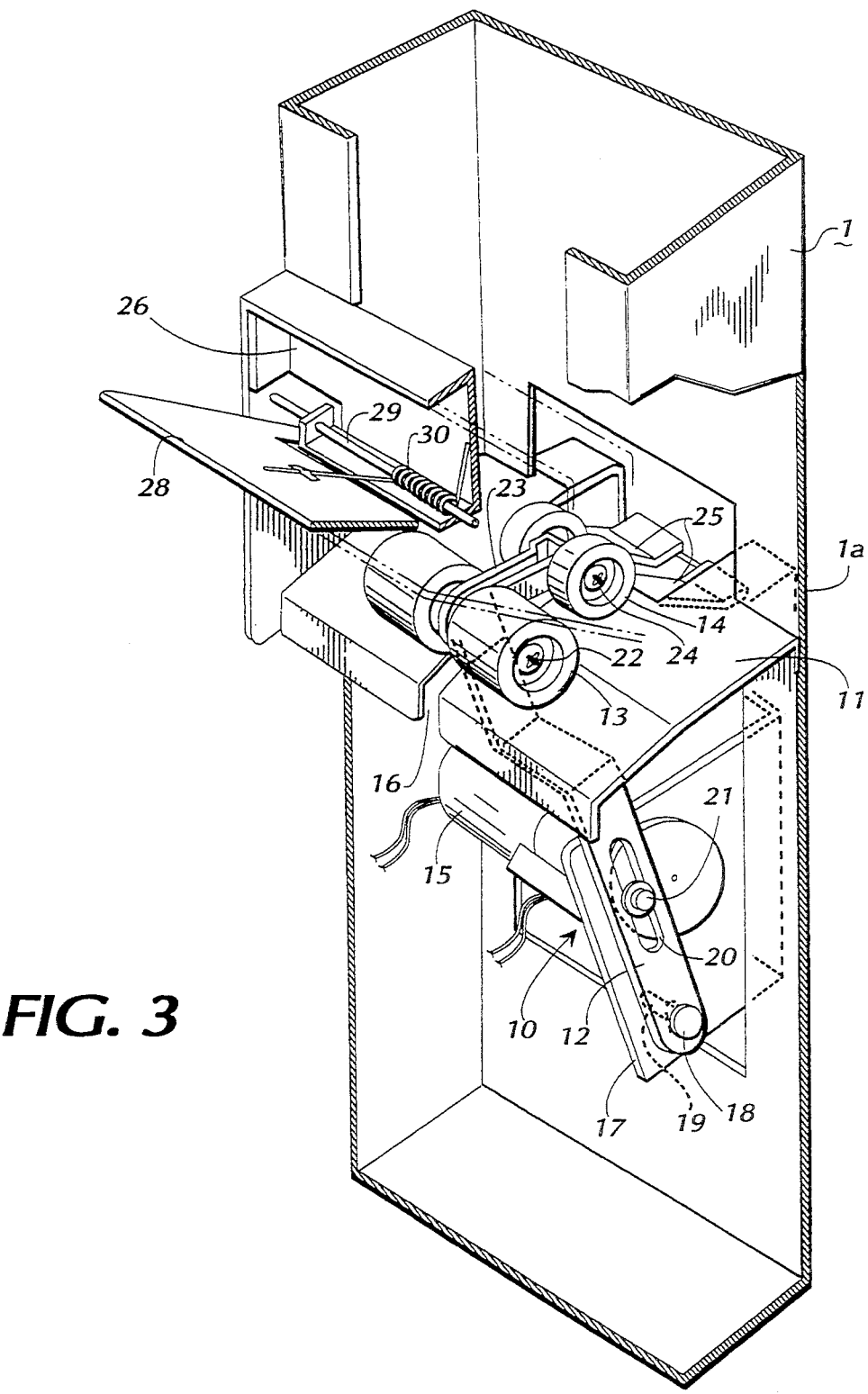
FIG. 3 is a cut-away perspective view of the internal structure of the merchandise push-out device when the skirt is pushed up by the merchandise.
Figure 4:
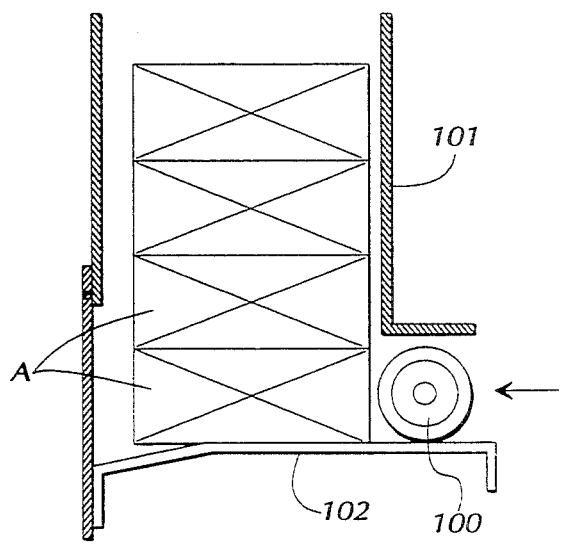
FIG. 4 is an cross-sectional view of the conventional merchandise push-out device in the waiting position.
Figure 5:
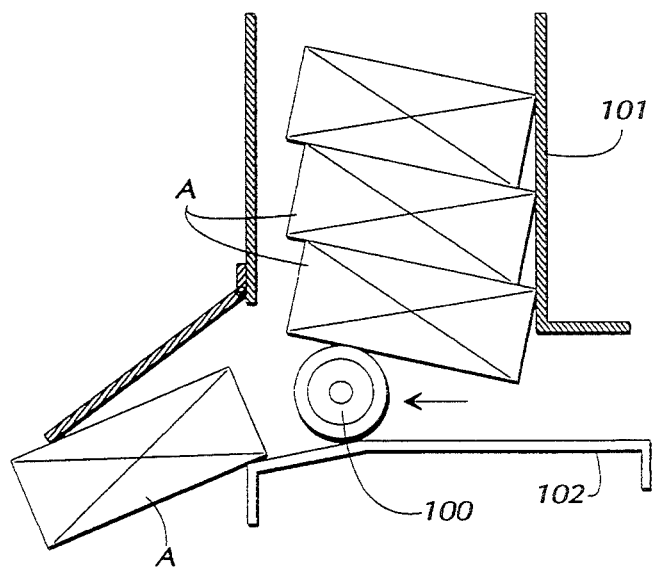
FIG. 5 is an cross-sectional view of the conventional merchandise push-out device in the push-out and support position.
Figure 6:
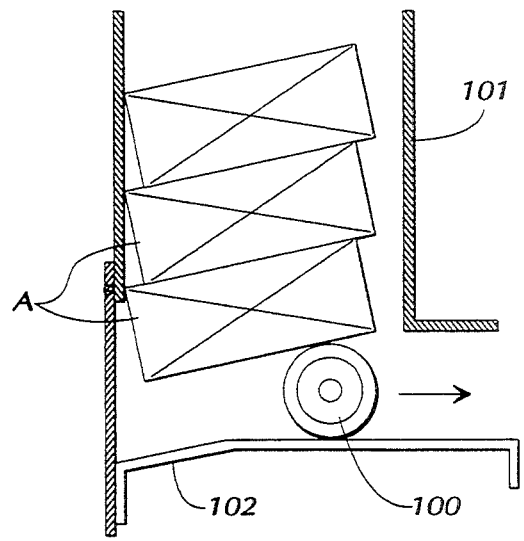
FIG. 6 is an cross-sectional view of the conventional merchandise push-out device in the retreat and support position.

Referring to FIGS. 1-3, the following is an illustrative example of the application of the merchandise push-out device as used in a vending machine for box-shaped merchandise such as cigarettes. The vending machine 80 has at least one merchandise stocker 1. Each merchandise stocker 1 is a vertically long box with open ends at the top and at the bottom. Multiple stockers 1 may be positioned vertically in a row inside the main body-of the vending machine 80. Box-shaped merchandise A, is supplied from the upper end of the stocker 1 with each piece of the merchandise A, such as cigarettes, lying horizontally and being stacked vertically.

As shown in FIG. 1, the stocker 1 is installed a certain distance D from the back wall 2 of the main body of the vending machine 80. This distance D is the space between the stocker 1 and the back wall 2 which is utilized as the waiting area for the merchandise push-out roller 13. The front 83 of the stocker 1 has an opening 27 at the center of its width. This opening 27 allows the front 84 of the stocked merchandise A to be checked visually from outside the vending machine 80.

The merchandise push-out device 10 is installed in the lower part of the stocker 1. The push-out device 10 is equipped with a guide plate 11, a rocking arm 12, a push-out roller 13 (the push-out member), a support roller 14 (the merchandise support member), and a motor 15, which is used for moving the rocking arm 12.

The guide plate 11 has a flat surface. The rear end 93 of the guide plate 11 is fixed to the rear wall 1a of the stocker 1, while the front end 92 of the guide plate 11 is extended forward approximately horizontally. The lowermost article of merchandise A can be held and supported on the top surface 94 of the guide plate 11. While being supported by the guide plate 11, the lowermost article of merchandise A is pushed forward from the back 85. As shown in FIG. 3, a slit 16 is formed in the front end 92 of the guide plate 11 at the center of the width. This slit 16 allows the upper end 86 of the rocking arm 12 to extend upward through the guide plate 11.

As shown in FIG. 1, the rocking arm 12 is supported by a rocking support shaft 18 which penetrates through a long hole 19 at the lower end of a mounting plate 17. The mounting plate 17 is installed to extend forward from the back wall 1a of the stocker 1. The rocking arm 12 is supported by the rocking support shaft 18 on the outside of the mounting plate 17 such that rocking arm 12 may rotate freely. The rocking support shaft 18 also allows the upper end 83 of the rocking arm 12 to rock back and forth. The upper end 83 of the rocking arm 12 is bent inward from the upper end of the mounting plate 17, and the lower end 87 of the rocking arm 12 extends to a position directly below the slit 16 in the guide plate 11. In addition, an elongated hole 20 extending longitudinally is formed into the rocking arm 12 in approximately the center of its height, through which an eccentric shaft 21 is inserted.

A push-out roller support shaft 22 is installed at the upper end 83 of the rocking arm 12 such that it extends perpendicularly through the rocking arm 12. The push-out roller 13 is installed onto the push-out roller support shaft 22 such that it may be able to rotate freely. As shown in FIG. 2, when the rocking arm 12 is rocked back and forth, the upper end 83 of the rocking arm 12 rocks back and forth in relation to the rocking support shaft 18 at the rocking arm's lower end 87. Since the rocking support shaft 18 has vertical play within the long hole 19, the bottom surface of the push-out roller 13 may be guided by the top surface 94 of the guide plate 11. Therefore, the push-out roller 13 moves back and forth in a horizontal linear movement along the guide plate 11.

As shown in FIG. 3, the motor 15 should be installed facing frontward from the inside of the mounting plate 17. The eccentric shaft 21 connected eccentrically to the drive shaft (not shown) of the motor 15 extends outside the mounting plate 17 and is positioned inside the elongated hole 20 in the rocking arm 12. When the motor 15 is driven, the eccentric shaft 21 is driven to revolve which causes the rocking arm 12 to rock back and forth and the push-out roller 13 to move back and forth. The motor 15 is controlled by a microcomputer, which drives the motor 15 for each rotation. As shown in FIG. 1, when not moving, the push-out roller 13 rests in the waiting position behind the lowermost piece of merchandise A.

The support roller 14, acting as the merchandise support member, is installed below the push-out roller 13 as a follow-up mechanism for the push-out roller 13. The support roller 14 is attached to the push-out roller 13 via a link 23. The top end of the link 23 is coupled to the push-out roller 13 on the same axis as the push-out roller support shaft 22 of the push-out roller 13. The lower end of the link 23 is coupled to the support roller 14 on the same axis as a support roller support shaft 24, which allows the support roller 14 to rotate freely. As shown in FIG. 1, while the push-out roller 13 is in the waiting position, the support roller 14 waits below the push-out roller 13 such that the support roller 14 is in a horizontally collapsed position with respect to push-out roller 13 while the push-out roller 14 is in a waiting position. As shown in FIG. 2, during the merchandise push-out operation as the push-out roller 13 moves forward and the support roller 14 is guided upward and diagonally by an inclined guide area 25 of the guide plate 11 and to the top surface 94 of the guide plate 11. The support roller 14 is slightly smaller in diameter than the push-out roller 13.

As shown in FIG. 2, a front wall 26 is installed above the front edge a the guide plate 11 to form a push-out opening 27. The height clearance of the push-out opening 27 is the distance between the bottom of the front wall 26 and the front edge 90 of the guide plate 11. The height clearance should be tall enough for one piece of merchandise A. When the lowermost piece of merchandise A is pushed forward, the next piece of merchandise A (the piece stacked on top of the lowermost piece of merchandise A) contacts the front wall 26 such that an unwanted push-out of the next piece of merchandise A is prevented.

In addition, a skirt 28 is installed at the push-out opening 27 between the lower edge 89 of the front wall 26 and the front edge 90 of the guide plate 11. The upper edge of the skirt 28 is coupled to a horizontal support shaft 29, which is coupled to the lower edge 89 of the front wall 26, such that the skirt 28 may rotate freely. This allows the skirt 28 to be used to open and close the push-out opening 27. A spring 30, which is attached to the horizontal support shaft 29, applies force to the skirt 28 to close the push-out opening 27 such that the push-out opening 27 remains closed except when the merchandise A is being pushed out of the push-out opening 27.

In the merchandise push-out device 10 of the above-mentioned construction, the motor 15 of the push-out device 10 turns once when a specified amount of coins are inserted and a merchandise selection button (not shown) is pressed. As shown in FIG. 1, this rotation of the motor 15 causes the push-out roller 13 waiting behind the lowermost piece of merchandise A to move forward. The push-out roller 13 presses against the lowermost piece of merchandise A on the guide plate 11 from the back 85 of the merchandise A and pushes the piece of merchandise A forward along the guide plate 11. This pushing out of the merchandise A causes the skirt 28 to open, allowing the lowermost piece of merchandise A to be transferred forward.

In the above-mentioned merchandise push-out device 10, when the push-out roller 13 moves forward, the support roller 14 is pulled up by the link 23 from the lower waiting position along the inclined guide area 25. As shown in FIG. 2, when the push-out roller 13 passes through the center of the length of the remaining upper pieces of merchandise A, the support roller 14 is positioned on the guide plate 11. Therefore, the lowest remaining piece of merchandise A is supported by the push-out roller 13 on its bottom front end and by the support roller with slightly smaller diameter, 14 on its bottom rear end such that the remaining upper pieces of merchandise A are able to maintain an approximately horizontal position.

After the lowermost piece of merchandise A is pushed out, the push-out roller 13 retreats. As shown in FIG. 1, the push-out roller 13 retreats and the support roller 14 returns to its original waiting position after being guided by the inclined guide area 25. During this return process, the remaining merchandise A maintains an approximately horizontal position as mentioned above. Consequently, close to no force is required to lift the merchandise A as the push-out roller 13 retreats. When the push-out roller 13 moves to the position behind the new lowermost piece of merchandise A in the stocker 1, the remaining upper merchandise A moves downward due to the weight of the merchandise A. The new lowermost piece of merchandise A is now supported on the guide plate 11, where it waits for the next push-out movement.

In the above-mentioned merchandise push-out operation, the rocking support shaft 18 at the lower end 87 of the arm 12 moves slightly in a vertical direction throughout the rocking process. This movement is due to the rocking support shaft 18 being supported inside the long hole 19 of the mounting plate 17, which gives the rocking support shaft 18 vertical play. Moreover, during the rocking process, the vertical play of the rocking support shaft 18 allows the push-out roller 13 to move horizontally and linearly on the guide plate 11.

In the above-mentioned application example, the push-out roller 13 is made to move horizontally and linearly by adding play between the rocking arm 12 coupled to the rocking support shaft 18 and its mounting plate 17. However, the horizontal linear movement of the push-out roller 13 may also be achieved by adding play between the push-out roller support shaft 22 and the rocking arm 12, or between the push-out roller 13 and the push-out roller support shaft 22. The above-mentioned rollers 13 and 14 are preferable as push-out and support members respectively, however, other types of rollers may also be used.

As described above, for this merchandise push-out device for vending machines, the push-out member is installed with play in the vertical direction. The push-out member is also guided in the horizontal linear direction because it utilizes the vertical play during the rocking of the rocking arm. The push-out member, therefore, is moved in the push-out direction in a horizontal linear movement. Consequently, during the series of movements for pushing out the bottom piece of stocked merchandise, no upward force is applied by the push-out member to the stacked merchandise. Therefore, the motor load and the power consumption are reduced.

In addition, a support member is installed behind the push-out member with a link, so that the upper merchandise can be maintained in an almost horizontal position by the support member. Consequently, during the retreating movement of the push-out member, no upward force is applied to the stacked merchandise, and the motor load and the power consumption are further reduced.

Therefore, this push-out device is ideal for use in vending machines in which reduction of power consumption is required, such as battery-operated vending machines, and has been found to be highly effective in actual application. Since the above-mentioned support member is positioned below the push-out member while it rests in the waiting position, there is no need to have a large waiting space behind the stocker. This feature, therefore, facilitates the reduction of the thickness of the vending machine.

We claim:

1. A merchandise push-out device for a vending machine with vertically stacked merchandise, wherein said push-out device pushes forward a lowermost piece of merchandise stacked in a merchandise stocker, said device comprising:
    means for pushing the lowermost piece of merchandise forward, wherein said pushing means includes a push-out member; and
    means for supporting at least one remaining piece of stacked merchandise in a substantially horizontal position as the lowermost piece of merchandise is being pushed forward, wherein said supporting means includes;
    said push-out member, and
    a support member linked to said push-out member, wherein said support member is collapsible in a horizontal direction with respect to said push-out member when said push-out member is in a waiting position ready to push the lower most piece of merchandise.

2. The device of claim 1, wherein said pushing means includes a rocking arm which is coupled to said push-out member, wherein said rocking arm pushes said push-out member forward and pulls said push-out member backward.

3. The device of claim 2, wherein said pushing means includes a motor which is coupled to said rocking arm, wherein said motor drives said rocking arm.

4. The device of claim 1, wherein said push-out member includes a roller.

5. The device of claim 1, wherein said pushing means includes a horizontal guide plate for ensuring said push-out member has horizontal movement as said push-out member pushes out the lowermost piece of merchandise.

6. The device of claim 5, wherein said guide plate includes a slit formed at the center of its width, wherein said slit may be used to allow a rocking arm to extend therethrough.

7. The device of claim 1, wherein said support member includes a roller.

8. The device of claim 1, wherein said support member is positioned below said push-out member when said push-out member is in a waiting position ready to push the lowermost piece of merchandise.

9. The device of claim 1, wherein said supporting means includes a horizontal guide plate for ensuring said push-out member and said support member have horizontal movement as they support at least one remaining piece of stacked merchandise.

10. The device of claim 9, wherein said supporting means includes an inclined guide plate coupled to said horizontal guide plate, wherein said inclined guide plate ensures said support member has diagonal movement when said support member is not being guided by said horizontal guide plate.

11. A method of pushing out merchandise in a vending machine with vertically stacked merchandise, said pushing method comprising the steps of:

(a) pushing a lowermost piece of merchandise horizontally forward away from at least one remaining piece of stacked merchandise with a push-out member;

(b) supporting at least one remaining piece of stacked merchandise with said push-out member;

(c) pulling a support member from a horizontally collapsed position with respect to said push-out member into a support position with said push-out member linked to said support member; and (d) supporting at least one remaining piece of stacked merchandise substantially horizontally with said push-out member and said support member.

12. The method of claim 11, wherein said pushing in step (a) is carried out with said push-out member moving horizontally along a horizontal guide plate.

13. The method of claim 11, wherein said supporting in step (b) is carried out with said push-out member positioned below at least one remaining piece of stacked merchandise.

14. The method of claim 11, wherein said pulling in step (c) is carried out with said push-out member pulling said support member diagonally upward along an inclined guide plate until said support member reaches a horizontal guide plate.

15. The method of claim 11, wherein said supporting in step (d) is carried out with said push-out member pulling said support member horizontally along a horizontal guide plate such that said push-out member and said support member are positioned below at least one remaining piece of stacked merchandise.

* * * * *